Aug. 18, 1953   M. BENEDICT ET AL   2,649,468
HYDROCARBON SYNTHESIS PROCESS AND THE
PRODUCTION OF SYNTHESIS GAS
Filed Nov. 12, 1947
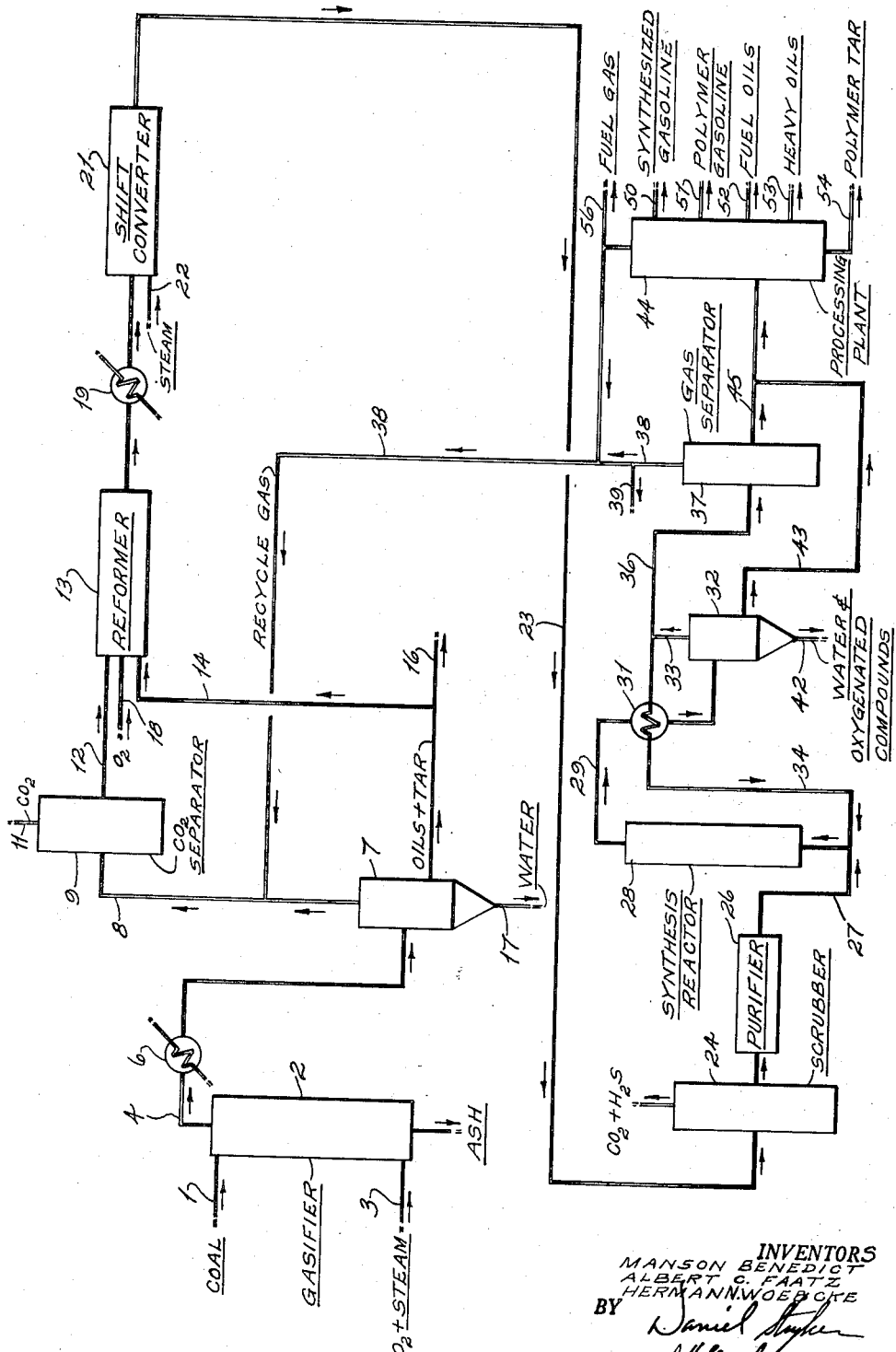
INVENTORS
MANSON BENEDICT
ALBERT C. FAATZ
HERMANN WOEBCKE
BY
ATTORNEYS Patented Aug. 18, 1953

2,649,468

UNITED STATES PATENT OFFICE 2,649,468

HYDROCARBON SYNTHESIS PROCESS AND THE PRODUCTION OF SYNTHESIS GAS

Manson Benedict, Westfield, Albert C. Faatz, Jr., Maplewood, and Herman N. Woebcke, North Bergen, N. J., assignors to Hydrocarbon Research, Inc., New York, N. Y., a corporation of New Jersey Application November 12, 1947, Serial No. 785,552

4 Claims. (Cl. 260—449.6)

This invention relates to the production of hydrocarbons, oxygenated hydrocarbons and the like from solid carbonaceous materials such as coal, lignite, peat, oil shale, coke, and the like.

The invention broadly contemplates subjecting solid carbonaceous materials, such as those mentioned, while in particle, granular, or other divided form, to contact in a gasification zone with an oxidizing gas, namely, oxygen which is supplemented with steam, under conditions so as to convert combustible constituents of the material into gas comprising a substantial amount of compounds containing both carbon and hydrogen atoms in the same molecule, including gaseous hydrocarbons. Resulting gasified products, including the aforesaid compounds, are conducted, at least in part, to a reforming zone wherein they are subjected to contact with oxygen at an elevated temperature to convert the compounds in question into carbon monoxide and hydrogen. The gaseous effluent material from the gasification zone may be treated first with oxygen at elevated temperature to effect conversion of the compounds in question into carbon monoxide and hydrogen and thereafter treated with steam in the presence of a shift catalyst also at elevated temperature so as to form additional hydrogen. Steam may be admitted to the reforming zone in which case subsequent treatment with steam may be omitted. The gas stream containing carbon monoxide and hydrogen is treated to remove $CO_2$ and sulphur compounds and subsequently passed to a synthesis reaction zone. Provision may be made for removing $CO_2$ both before and after the shift conversion. Sulphur compounds may be removed before or after the shift conversion.

The synthesis reaction is preferably carried out under elevated pressure at a temperature in the range of about 500 to 700° F. with an iron type synthesis catalyst, so as to convert carbon monoxide and hydrogen into a product comprising mainly $C_3$ and higher molecular weight hydrocarbons. Gaseous constituents, including gaseous hydrocarbons such as methane, are separated from the synthesized products and are conducted in substantial amount to the previously mentioned reforming zone.

Residual gases, including hydrocarbon gases resulting from the further processing of the $C_3$ and higher molecular weight hydrocarbons produced in the synthesis, may also be conducted to the reforming step.

An important feature of the invention distinguishing it from the prior art is that of treating the gasified material containing volatiles in addition to some carbon monoxide and hydrogen in a separate or reforming zone with oxygen so as to convert the volatile constituents containing both carbon and hydrogen atoms in the same molecule into carbon monoxide and hydrogen and thereby produce synthesis gas of improved quality and having the desired proportions of hydrogen and carbon monoxide. The conversion of hydrocarbons and other volatilized constituents by partial combustion with oxygen, preferably oxygen of at least about 95% purity, in the separate reforming zone is realized with a high degree of efficiency and economy.

A further feature involves converting tar, oils, and resinous compounds by such reforming into valuable synthesis gas constituents. The reforming step is also advantageous from the standpoint of converting sulphur compounds, particularly organic sulphur compounds, into a form more readily removable from the synthesis gas by scrubbing.

A still further feature of the process is that of recycling to the reforming zone residual gases containing $C_1$ and $C_2$ hydrocarbons removed from the synthesis effluent and also obtained from the further processing of $C_3$ and higher molecular weight hydrocarbon products of the synthesis operation. This further processing usually involves treatment of at least a portion of the hydrocarbons, particularly those falling in the gasoline range, with clay or other contact material at an elevated temperature, and the catalytic polymerization of $C_3$—$C_4$ hydrocarbons. These treating operations and the accompanying fractionating steps result in the production of substantial amounts of hydrocarbon gas.

The ratio of hydrogen to carbon in these hydrocarbon gases recycled to the reforming zone is relatively high. Therefore, the addition of these gases to the reformer is productive of synthesis gas containing a higher ratio of hydrogen to carbon monoxide than would otherwise be the case, and therefore reduces the amount of steam used in the reformer or the amount of subsequent shift conversion that otherwise might be necessary to produce synthesis gas containing about one mol of carbon monoxide to two moles of hydrogen, for example.

These and other advantages will be apparent from the subsequent description of the invention in connection with the accompanying drawing.

The drawing is a diagrammatic illustration of a preferred method of carrying out the process of the present invention. This preferred method is described in detail to clearly illustrate various features of the invention. A number of modifications are possible, some of which are suggested herein. In describing the flow illustrated in the drawing, reference will be made to the treatment of coal.

The method of flow contemplated in the drawing involves gasification of the coal while in a crushed or divided form, the bulk of the particles ranging in diameter from about two to fifteen millimeters.

As indicated in the drawing, the coal in divided form is conducted from a source not shown through conduit 1 into the upper portion of a gasifier 2 while oxygen and steam are introduced at the base of the gasifier through a pipe 3. The oxygen and steam may be introduced as a mixture in the proportion of about ten volumes of steam to one volume of oxygen at a temperature of about 1,000° F. Sufficient oxygen is added so that the resulting exothermic reaction heat liberated will be sufficient for the gasification of the coal. A minimum quantity of steam is added to complete the gasification of the coal, and frequently an excess of steam is added to prevent excessive temperatures. Oxygen and steam flow countercurrently to the mass of coal particles moving downwardly through the gasifier.

The gasifier is maintained under a pressure ranging from atmospheric to fifty atmospheres or more and usually about 20 to 30 atmospheres. Elevated pressures are conducive to the production of methane. The methane is converted by the present process to more valuable products. The temperature at the point of product gas discharge from the gasifier is generally within the range of from about 400 to 1200° F. The temperature increases toward the base of the gasifier and may be as high as 2500° to 2800° F. Satisfactory operation of the gasifier is not generally obtained unless a temperature of 1200° F. or above exists at some point in the gasifier. The temperature may be regulated by control of the rate of feed of oxygen and steam to the gasifier.

The base of the gasifier is provided with means for discharging ash or non-volatile non-carbonaceous components of the feed therefrom either as ash or as a molten slag.

The product gas is removed through pipe 4 to a cooler 6 wherein water, oils, and tar are condensed. The cooled gaseous effluent is passed to a separator 7 wherein condensed water, oils and tar are separated from the gas stream. The residual gas is then passed via line 8 to a carbon dioxide separator 9 wherein carbon dioxide is removed and discharged through pipe 11.

The scrubbed gas is removed through pipe 12 and introduced to reformer 13 wherein hydrocarbon constituents and other volatized components of the coal are subjected to partial combustion with oxygen.

Oils and tars separated from the gaseous effluent in separator 7 are passed via line 14 to the reformer 13. If desired, a portion or all of the oils and tar may be withdrawn from the system through line 16 for the recovery of valuable organic constituents therefrom. Water is discharged from separator 7 through line 17.

Oxygen is introduced to the reforming zone 13 from pipe 18. Conditions are maintained so that the conversion consists essentially of partial combustion of compounds containing both carbon and hydrogen atoms into carbon monoxide and hydrogen at a temperature of about 2200 to 2300° F. or in the range of about 2000 to 2500° F. The reforming zone advantageously comprises an unpacked chamber with suitable means for effecting thorough mixing of the oxygen and gas upon introduction to the interior of the vessel. Oxygen is advantageously preheated to an elevated temperature of 600° F. or higher before being introduced to the reforming vessel. Gases to be reformed are also advantageously preheated, preferably to 900° F. or higher.

The resulting product gas is continuously discharged from the reforming zone through a cooler 19 which may take the form of a waste heat boiler wherein sensible heat of the product gas is used to generate steam. The gas is thus cooled to a temperature of about 600° F.

Since it may be desired to obtain a synthesis gas containing about two mols of hydrogen per mol of carbon monoxide, provision is made for subjecting the gas to a shift conversion wherein steam is reacted with a portion of the carbon monoxide in the presence of a shift catalyst at a temperature of about 600 to 850° F. A suitable catalyst for this purpose comprises iron oxide promoted with small amounts of chromium oxide and magnesium oxide. The iron oxide content of the catalyst may amount to from 60 to 90% $Fe_2O_3$.

After cooling of the gas in cooler 19, it is passed to a shift converter 21 to which steam is introduced from pipe 22. In the shift converter, steam and carbon monoxide are reacted in the presence of a catalyst to produce hydrogen and carbon dioxide. The hydrogen-carbon monoxide ratio can thus be adjusted to provide a synthesis gas feed containing approximately two mols of hydrogen per mol of carbon monoxide.

This shift conversion may be effected in the reforming zone 13 by the introduction of a suitable amount of steam thereto, together with the oxygen. In such an instance, the converter 21 may be omitted, or the amount of conversion carried out in the shift converter greatly reduced. In a preferred embodiment, no steam is admitted to the reformer 13 and carbon monoxide and steam are reacted in the presence of a specific catalyst in a shift converter 21 to increase the hydrogen content of the stream. Obviously, a portion of the gas may bypass the shift converter 21 if desired and a conventional recycle may be employed if so desired.

The resulting gas mixture from shift converter 21 is passed through pipe 23 to a scrubbing unit 24. Carbon dioxide and most of the hydrogen sulphide present in the gas are removed by scrubbing with water or other suitable reagents. Scrubbing may be effected, for example, with cold water at a temperature of 45° F. and below.

The scrubbed synthesis gas retaining about ½% by volume of carbon dioxide and a small amount of hydrogen sulphide is conducted to a final purifying zone 26 wherein the gas is subjected to contact with spongy iron oxide (Luxmasse) at a temperature of about 300 to 700° F. so as to effect removal of the remainder of the hydrogen sulphide, as well as carbonyl sulphide. The purified synthesis gas is thereafter conducted through pipe 27 to a synthesis reactor 28. In the reactor 28, the synthesis gas is subjected to contact with a fluidized powdered synthesis catalyst of the iron type, for example, a catalyst comprising iron and small amounts of silica, alumina and alkali metal oxide. The contact between the synthesis catalyst is effected at a temperature in the range of about 500 to 700°

F. and preferably at about 600 to 650° F. The pressure may range from about 10 to 40 atmospheres, preferably, about 15 to 30 atmospheres.

Under these conditions, of the carbon monoxide converted (usually 95 to 98%), about 70 to 75% is converted to $C_3$ and higher molecular weight compounds, including oxygenated hydrocarbons. The latter may amount to from about 5 to 8% of the $C_3$ and higher hydrocarbons produced. In addition, about 15% of the carbon monoxide may be converted to $C_1$ and $C_2$ hydrocarbons, while the remainder of the carbon monoxide may be converted to carbon dioxide in the synthesis reaction.

A stream of synthesis products, including water vapor, is continuously removed through pipe 29 and passed through heat exchanger 31 to a receiving drum 32 maintained under substantially synthesis reaction pressure, and wherein separation into gas and liquid phases occurs.

The gas phase is removed through pipe 33 and recycled in part through exchanger 31 and pipe 34 to the synthesis reaction zone.

The remainder of this gas is conducted through pipe 36 to a gas separator 37, suitably an absorption unit wherein it is subjected to contact with an absorption oil such as a normally liquid fraction of the synthesis product, in order to absorb liquefiable hydrocarbons comprising butanes, butenes, pentanes, etc. The resulting dry gas is removed through pipe 38.

Nitrogen is present in the system as an impurity in the oxygen stream and as a constituent of the coal. In order to avoid a build-up of nitrogen in the system, provision is therefore made for purging through line 39 a portion of the dry gas leaving separator 37 through pipe 38. Purged gas may be discharged into a fuel gas system. The gas so purged may amount to about 25% of the total dry gas.

The remainder of the dry gas is conducted through pipe 38 to the carbon dioxide separator 9 for recycle to the reformer 13.

Separator 32 is maintained at a temperature which may be in the range of about 60 to 150° F. and superatmospheric pressure. Under these conditions, separation of condensate into liquid hydrocarbon and aqueous layers occurs, the aqueous layer containing mainly oxygenated compounds produced by the synthesis reaction. This aqueous layer is discharged through pipe 42 and subjected to further treatment for the recovery of oxygenated compounds.

The liquid hydrocarbon layer is removed through pipe 43 and conducted to a hydrocarbon processing unit or plant 44. Hydrocarbons separated from the recycle gas in the gas separator 37 are conducted through pipe 45 to plant 44.

The plant 44 may comprise conventional equipment for treating, refining and fractionation of the synthesis hydrocarbons. For example, the liquid products of the synthesis reaction are advantageously subjected to contact with a solid absorbent material such as clay, bauxite, etc. at an elevated temperature in the range of about 700 to 950° F. and under substantially atmospheric pressure so as to effect dehydration of oxygenated compounds contained therein and to improve the octane rating of the gasoline hydrocarbons.

The $C_3$ and $C_4$ fraction of the synthesized products is advantageously subjected to catalytic polymerization as, for example, by contact with a polymerization catalyst, such as phosphoric acid type, at a temperature of 300 to 500° F. and under pressure ranging from about 10 to 100 atmospheres.

Either before or after the aforesaid clay treating, the liquid hydrocarbons may be fractionated to remove a fraction higher boiling than gasoline and suitable for the manufacture of diesel oil.

By way of example, the products resulting from the various processing steps in the plant 44 may comprise synthesized gasoline removed through pipe 50, polymer gasoline removed through pipe 51, fuel oil, e. g., diesel oil, removed through pipe 52, higher boiling oil removed through pipe 53, and polymer tar removed through pipe 54.

In addition to the foregoing products, there is also produced from plant 44 residual gas containing light hydrocarbons, hydrogen, and carbon dioxide. This residual gas is conducted through pipe 56 and pipe 38 to the carbon dioxide separator 9 and, after removal of carbon dioxide therefrom, it is returned to the reforming zone 13. Residual gas not so recycled may be discharged through pipe 56 and is suitable for use as fuel gas.

Instead of effecting the previously mentioned shift conversion prior to purification of the gas stream, it may be effected at a subsequent point after removal of carbon dioxide and combined sulfur from the gas stream. An advantage in effecting the shift conversion at this latter point in the system is that the previous removal of carbon dioxide reduces the concentration of carbon dioxide in the feed to the convertor which thus facilitates the shift conversion.

In the operation of the overall process, the individual unit operations of reforming, catalytic shift conversion, impurity removal, and synthesis, etc. can be carried out at pressures substantially the same as or not greatly lower than that prevailing in the gasification zone 2. The pressure may be progressively lower in each succeeding stage of the process as a result of pressure differential through each succeeding unit. For example, the pressure prevailing in the gasifier 2 may be about 350 pounds per square inch gage; in reformer 13, 340 pounds; in scrubber 24, 320 pounds; in purifier 26, 310 pounds; and in synthesis unit 28, 300 pounds. Pumps and compressors may be provided at intermediate points to compensate for pressure losses in the system.

The drawing is merely schematic and does not show the usual auxiliary equipment, including pumps, compressors, heaters, coolers, heat exchangers, etc. Likewise, it will be understood that the scrubbing and absorbing units referred to in the drawing will include strippers for denuding the scrubbing or absorbing liquid of absorbed materials.

In the operation of the gasifier, a small amount of coke fines and ash may be carried over in the effluent gas stream. This entrained solid material is removed in the separator 7 and, therefore, provision may be made for removing the solid material from the liquid by filtration, settling, or a combination of such operations.

In a modification of this invention, the oils and tar contained in the effluent stream from the gasifier 2 are passed in the vapor state to the reformer 13. In this instance it is not advisable to cool the gaseous effluent. The stream of gaseous effluent from the gasifier may be heated to preclude the possibility of deposition of tar in the flow line. A preferred mode of supplying heat to the gas stream comprising compounds containing both hydrogen and carbon atoms, e. g., the gaseous effluent from the gasifier 2, is by the addition of oxygen to the gas stream. The resulting reaction at the elevated temperature is effective to increase the stream temperature and effect a partial conversion of said components to carbon monoxide and hydrogen. In the reforming operation, the reaction of oils, tars, and other hydrocarbons and substituted hydrocarbons with oxygen serves to convert substantially all such components to carbon monoxide and hydrogen with incidental formation of carbon dioxide. Carbon dioxide may be readily removed from the resulting gas.

It is also contemplated that the gasification of the solid carbonaceous feed may be carried out in a manner other than that specifically mentioned. For example, the fluidization technique may be employed in the gasifier wherein the feed material, in finely divided or powdered form, is maintained in a fluidized state during contact with steam and oxygen.

*Example*

A bituminous coal is processed in accordance with this invention. The ultimate analysis is as follows:

|  | Percent |
|---|---|
| Carbon | 62.1 |
| Hydrogen | 4.0 |
| Oxygen | 12.6 |
| Nitrogen | 0.8 |
| Sulphur | 1.4 |
| Ash | 19.1 |

The coal is crushed to 2–10 mesh and charged to a gasifier of the Lurgi type equipped with a rotating grate for discharge of ash. The gasifier is operated at 350 pounds per square inch gauge. A mixture of superheated steam at 1000° F. and oxygen of 95% purity is supplied to the base of the generator in proportions of about 7.7 volumes of steam per volume of oxygen. About 2.85 std. cu. ft. of oxygen per pound of coal is supplied to the generator in the steam-oxygen mixture.

The gaseous effluent from the gasifier, withdrawn at 1000° F. has the following composition:

|  | Percent by volume |
|---|---|
| Hydrogen | 22 |
| CO | 18 |
| $CO_2$ | 18 |
| $CH_4$ | 12 |
| $H_2O$ | 29 |
| Light hydrocarbons and impurities | 1 |

After removal of tar, oils, and water, the gas stream is compressed and most of the carbon dioxide is scrubbed from it. The residual gas is reacted with oxygen at 2300° F. and 575 pounds per square inch gauge. The raw gas is preheated to 1000° F. before introduction into the reformer; the oils containing tar in solution are atomized by injection into the reformer.

The gaseous effluent from the reformer is passed to a shift converter where it is contacted with a chromia-magnesia-iron oxide catalyst at 800° F. and 560 p. s. i. g. The gaseous effluent from the shift converter is scrubbed with diethyl amine solution at 530 p. s. i. g. and atmospheric temperature, then passed over a bed of spongy iron oxide at 770° F. and 515 p. s. i. g.

The purified synthesis gas so prepared is essentially a mixture of hydrogen and carbon monoxide and has the following composition:

|  | Percent by volume |
|---|---|
| Hydrogen | 62.8 |
| Carbon monoxide | 30.0 |
| Carbon dioxide | 0.5 |
| Nitrogen | 6.5 |
| Water | 0.2 |

This synthesis gas is converted to hydrocarbons, oxygenated compounds, and the like, by contact with a fluidized iron catalyst at 600° F. and 500 p. s. i. g.

The water, condensible hydrocarbons and oxygenated hydrocarbons are removed from the synthesis reactor effluent by condensation; desirable hydrocarbons, by absorption in mineral seal oil. The dry gas from the mineral seal oil absorber has the following composition:

|  | Percent by volume |
|---|---|
| CO | 2.5 |
| $CO_2$ | 12.1 |
| $CH_4$ | 7.1 |
| $C_2$ hydrocarbons | 3.8 |
| $C_3$ hydrocarbons | 0.3 |
| Hydrogen | 41.2 |
| Nitrogen | 33 |

About 20 per cent of this dry gas stream is vented to prevent nitrogen build-up in the system. The remainder of the stream, after removal of carbon dioxide is passed to the reformer for conversion of the hydrocarbons to carbon monoxide and hydrogen for recycle to the synthesis reactor.

The foregoing example is offered by way of illustration only and is not to be construed as in any way limiting the invention.

Obviously, many modifications and variations of the invention as above set forth may be made without departing from the spirit and scope thereof, and therefore only such limitations should be imposed as are indicated in the appended claims.

We claim:

1. In a process for the generation of carbon monoxide and hydrogen from coal wherein coal is reacted with oxygen and steam to produce a gas stream rich in carbon monoxide and hydrogen and containing carbon dioxide and hydrocarbons, the improvement which comprises separating carbon dioxide from said gas stream and thereafter converting the hydrocarbons to additional carbon monoxide and hydrogen by reacting said hydrocarbons in admixture with said carbon monoxide and hydrogen in said gas stream with substantially pure oxygen in an amount sufficient only for reaction with said hydrocarbons at a temperature within the range of from about 2,000 to about 2,500° F. and a pressure above about 20 atmospheres in an unpacked reaction zone and in the absence of a catalyst to produce carbon monoxide and hydrogen substantially free from hydrocarbons and carbon dioxide.

2. In a process for the synthesis of normally liquid hydrocarbons and the like from carbon monoxide and hydrogen wherein coal is subjected to reaction with oxygen and steam to produce a gas stream rich in carbon monoxide and hydrogen and containing carbon dioxide and hydrocarbons, and carbon monoxide and hydrogen are subjected to a hydrocarbon synthesis reaction producing a synthesis effluent comprising normally liquid hydrocarbons and a gaseous residue including normally gaseous hydrocarbons admixed with hydrogen, carbon monoxide and carbon dioxide; the improvement which comprises separating carbon dioxide from said gas stream and from a portion of said gaseous residue, and thereafter converting the hydrocarbons in said gas stream and in said portion of said gaseous residue to additional carbon monoxide and hydrogen by reacting said hydrocarbons in admixture with said carbon monoxide and hydrogen with substantially pure oxygen in an amount sufficient only for reaction with said hydrocarbons at a temperature within the range of from about 2,000 to about 2,500° F. and at a pressure above about 20 atmospheres in an unpacked reaction zone and in the absence of a catalyst to produce a mixture comprising carbon monoxide and hydrogen substantially free from hydrocarbons and carbon dioxide.

3. In a process for the generation of carbon monoxide and hydrogen from coal wherein coal is reacted with oxygen and steam at an elevated temperature to produce a hot gas stream rich in carbon monoxide and hydrogen and containing hydrocarbons including tarry vapors distilled from the coal, the improvement which comprises adding oxygen to said hot gas stream in an amount sufficient for reaction with only a portion of said hydrocarbons whereby additional heat is added to said gas stream due to the resulting exothermic reaction therein between said oxygen and hydrocarbons and condensation of said tarry vapors in said hot gas stream is substantially precluded; subsequently separating carbon dioxide from said gas stream; thereafter converting hydrocarbons in said gas stream to additional carbon monoxide and hydrogen by reacting said hydrocarbons in admixture with carbon monoxide and hydrogen in said gas stream with substantially pure oxygen in an amount sufficient only for reaction with said hydrocarbons at a temperature within the range of from about 2,000 to about 2,500° F. and a pressure above about 20 atmospheres in an unpacked reaction zone and in the absence of a catalyst to produce carbon monoxide and hydrogen substantially free from hydrocarbons and carbon dioxide.

4. In a process for the generation of carbon monoxide and hydrogen from coal wherein coal is reacted with oxygen and steam to produce a gas stream rich in carbon monoxide and hydrogen and containing carbon dioxide and hydrocarbons, the improvement which comprises separating carbon dioxide from said gas stream and thereafter converting said hydrocarbons to additional carbon monoxide and hydrogen by reacting said hydrocarbons in admixture with said carbon monoxide and hydrogen in said gas stream with substantially pure oxygen in an amount sufficient only for reaction with said hydrocarbons at a temperature within the range of from about 2,000 to about 2,500° F. in an unpacked reaction zone and in the absence of a catalyst to produce carbon monoxide and hydrogen substantially free from hydrocarbons and carbon dioxide.

MANSON BENEDICT.
ALBERT C. FAATZ, Jr.
HERMAN N. WOEBCKE.

References Cited in the file of this patent

UNITED STATES PATENTS

| Number | Name | Date |
|---|---|---|
| 1,921,856 | Wietzel et al. | Aug. 8, 1933 |
| 1,960,912 | Larson | May 29, 1934 |
| 1,971,728 | Perry | Aug. 28, 1934 |
| 2,013,699 | Richardson | Sept. 10, 1935 |
| 2,121,733 | Cottrell | June 21, 1938 |
| 2,243,869 | Keith, Jr., et al. | June 3, 1941 |
| 2,274,064 | Howard et al. | Feb. 24, 1942 |
| 2,324,172 | Parkhurst | July 13, 1943 |
| 2,346,754 | Hemminger | Apr. 18, 1944 |
| 2,347,682 | Gunness | May 2, 1944 |
| 2,349,438 | Koppers | May 23, 1944 |
| 2,375,500 | Silver et al. | May 8, 1945 |
| 2,431,632 | Brandt | Nov. 25, 1947 |
| 2,436,938 | Scharmann | Mar. 2, 1948 |
| 2,482,284 | Michael et al. | Sept. 20, 1949 |
| 2,493,454 | Hagy | Jan. 3, 1950 |
| 2,537,153 | Nelson et al. | Jan. 9, 1951 |

OTHER REFERENCES

Rambush, Modern Gas Producers, pp. 315–317, 1 page of dwg., December 11, 1923.